(12) United States Patent
Chan (10) Patent No.: US 11,070,486 B2
(45) Date of Patent: Jul. 20, 2021

(54) OVERALL PERFORMANCE WHEN A SUBSYSTEM BECOMES OVERLOADED

(71) Applicant: Oath Inc., New York, NY (US)

(72) Inventor: Patrick P. Chan, Palo Alto, CA (US)

(73) Assignee: Verizon Media Inc., New York, NY (US)

( * ) Notice: Subject to any disclaimer, the term of this patent is extended or adjusted under 35 U.S.C. 154(b) by 331 days.

(21) Appl. No.: 15/152,428

(22) Filed: May 11, 2016

(65) Prior Publication Data

US 2017/0331760 A1 Nov. 16, 2017

(51) Int. Cl.
*H04L 12/923* (2013.01)
*H04L 12/911* (2013.01)

(52) U.S. Cl.
CPC .......... *H04L 47/762* (2013.01); *H04L 47/743* (2013.01)

(58) Field of Classification Search
CPC ...... H04L 47/762; H04L 47/743; H04L 67/02
See application file for complete search history.

(56) References Cited

U.S. PATENT DOCUMENTS

| | | | | |
|---|---|---|---|---|
| 7,058,958 B1 * | 6/2006 | Shutt | ................. | G06F 17/30566 707/999.001 |
| 9,059,938 B1 * | 6/2015 | Strand | ..................... | H04L 67/28 |
| 2003/0037113 A1 * | 2/2003 | Petrovykh | ............... | H04L 51/00 709/205 |
| 2011/0167170 A1 * | 7/2011 | Kovvali | ................ | H04W 28/06 709/232 |
| 2016/0242000 A1 * | 8/2016 | Venkatraman | .......... | H04W 4/08 |
| 2017/0230451 A1 * | 8/2017 | Paramasivam | ... | G06F 16/24573 |
| 2017/0272343 A1 * | 9/2017 | Giles | ....................... | H04L 43/10 |

OTHER PUBLICATIONS

Microsoft, "Viewing Dependencies," updated Jun. 30, 2009.

* cited by examiner

*Primary Examiner* — Philip C Lee
(74) *Attorney, Agent, or Firm* — Cooper Legal Group, LLC (57) ABSTRACT

Methods and apparatus for improving performance of a system including a first computing system are disclosed. In one embodiment, the first computing system receives a request via a network from a client device. The first computing system determines whether a second computing system is available to respond to requests from the first system. The first computing system obtains a response to the request received from the client device based, at least in part, on one or more estimated values maintained by the first computing system according to whether the second computing system is available to respond to requests from the first computing system. The first computing system transmits the response to the client device.

23 Claims, 5 Drawing Sheets

OVERALL PERFORMANCE WHEN A SUBSYSTEM BECOMES OVERLOADED

BACKGROUND OF THE INVENTION

The present disclosure relates generally to computer implemented methods and apparatus for improving performance of a computing system. More particularly, the disclosure relates to responding to client requests received by a computing system over a network.

A computing system may be designed to perform a variety of tasks. For example, a video system may be configured to stream videos over the Internet to client devices in response requests received from the client devices. As another example, a language translation system may be configured to translate phrases input to the system from a first selected language into a selected language.

The time that it takes a computing system to perform a task in response to a client request may be determined by a variety of factors. For example, these factors may include central processing unit (CPU) speed, number of CPUs, and/or memory size. In some instances, a computing system may depend upon information from another service to complete the requested task. Unfortunately, a delay in the receipt of information from another service can result in a corresponding delay in the transmission of a response to the requesting client.

SUMMARY OF THE INVENTION

Methods and apparatus for improving performance of a system including a first computing system are disclosed. In one embodiment, a first computing system receives a request via a network from a client device. The first computing system determines whether a second computing system is available to respond to requests from the first system. The first computing system obtains a response to the request received from the client device based, at least in part, on one or more estimated values maintained by the first computing system according to whether the second computing system is available to respond to requests from the first computing system. The first computing system transmits the response to the client device.

In another embodiment, the invention pertains to a computing system comprising a processor and a memory. The computing system may be configured to perform one or more of the disclosed method operations. In another embodiment, the invention pertains to a computer readable storage medium having computer program instructions stored thereon that are arranged to perform one or more of the disclosed method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the,"

again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In recent years, the Internet has been a main source of information for millions of users. To access information pertaining to a particular topic, a user may access a particular web site or web page. In other instances, a user may access information via an application installed on a mobile device such as a laptop or mobile phone.

In response to a request received from a client device, a first computing system may generate and transmit the requested information to the client device for presentation via a web page or mobile application. In some instances, the first computing system is "dependent" upon a second computing system for intermediate data. Once the intermediate data is received from the second computing system, the first computing system generates a response to the client request using the intermediate data and transmits the response to the client device. Unfortunately, where the second computing system is overloaded, the delay perceived by the user of the client device may be unacceptable.

In accordance with various embodiments, the first computing system determines whether the second computing system is overloaded or otherwise unavailable. Where the first computing system has determined that the second computing system is overloaded or otherwise unavailable, the first computing system may use a locally maintained "estimated value" instead of the intermediate data that it would have otherwise obtained from the second computing system. Since the first computing system may forego communicating with the second computing system in these instances, the latency perceived by the user may be minimized. Example systems and methods for processing client requests for services will be described in further detail below.

Figure 1:
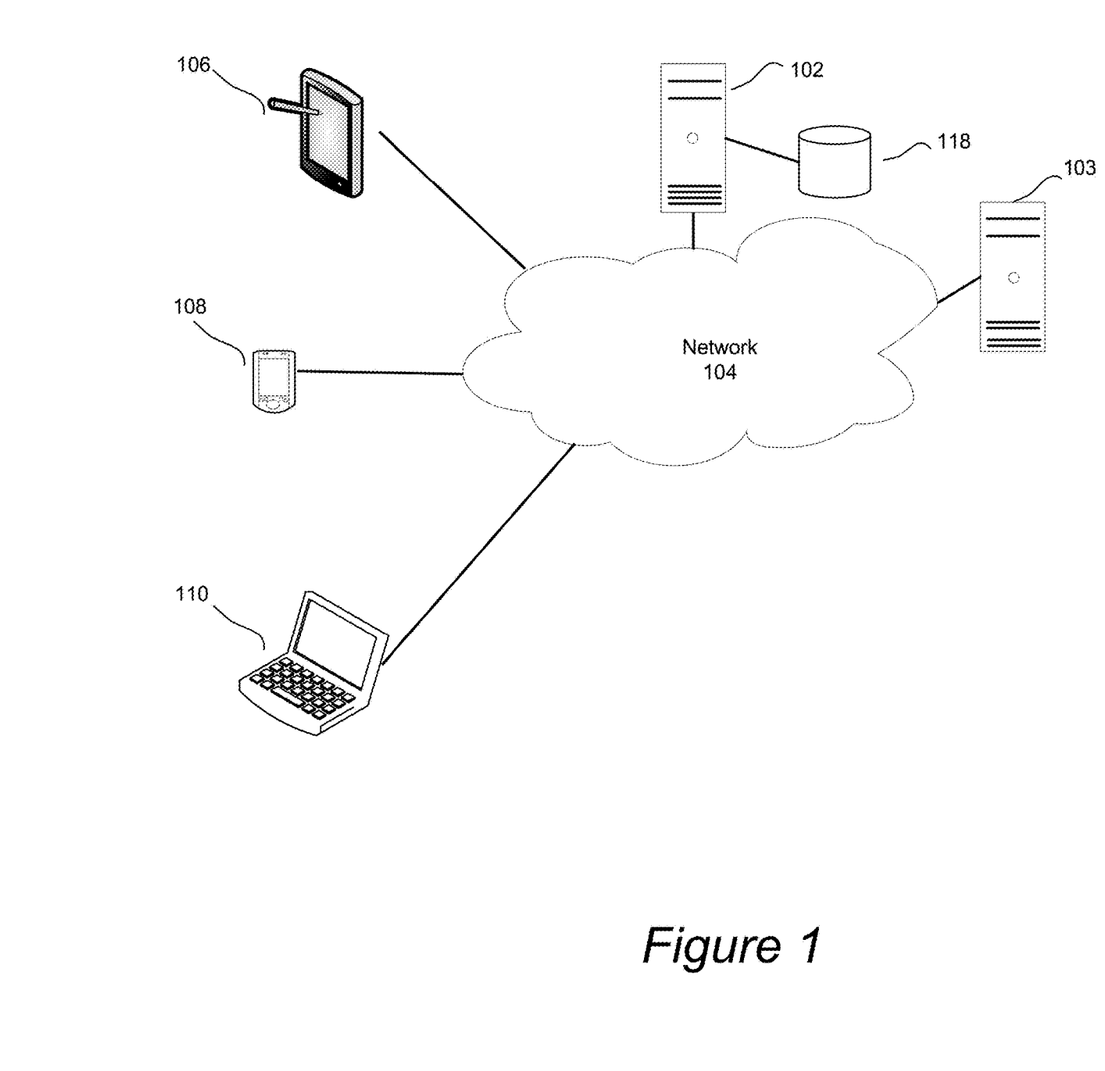
FIG. 1 is a block diagram illustrating an example system in which various embodiments may be implemented.

FIG. 1 is a diagram illustrating an example system in which various embodiments may be implemented. The disclosed embodiments may be implemented in some centralized manner. This is represented in FIG. 1 by server(s) 102, which may correspond to multiple distributed devices and data store(s). For example, the server(s) 102 may include a web server, search server, and/or content server. The server(s) 102 and/or corresponding data store(s) may store user account data, user information, and/or content.

A first computing system represented by the server(s) 102 may provide a variety of services to its users. For example, the first computing system may provide weather services to requesting client devices. In addition, a second computing system, represented in this example by server(s) 103, may be configured to provide data in response to requests it receives from the first computing system or other systems/devices. For example, the second computing system may be configured to provide geolocation services including a city and state for a given set of coordinates. The first computing system and the second computing system may be components of a single system (e.g., within the same wide area network or local area network). For example, the second computing system may be a sub-system of the first computing system. Alternatively, the second computing system and the second computing system may be implemented separately from one another (e.g., via separate web sites).

The data the second computing system provides may be used as intermediate data by the first computing system to generate responses to client requests. In the example set forth above, when a client device requests current weather information from the first computing system, the first computing system may transmit geographic coordinates of the client device to the second computing system. The second computing system may identify a (City, State) combination that corresponds to the geographic coordinates and transmit the (City, State) pair to the first computing system. The first computing system may then obtain current weather information for the identified (City, State) and provide the weather information in real-time to the client device.

In accordance with various embodiments, the first computing system may determine whether the second computing system is available (e.g., overloaded) according to a particular set of criteria (e.g., time to respond to requests from the first computing system). If the first computing system determines that the second computing system is available, the first computing system may transmit a request including information pertaining to a particular client request to the second computing system and use data received from the second computing system as intermediate data to generate a response to the client request. Alternatively, if the first computing system determines that the second computing system is unavailable, the first computing system may use locally obtained estimated value(s) to generate the response to the client request, as will be described in further detail below.

In some embodiments, services may be provided to a client device based, at least in part, on a user profile. An example user profile will be described in further detail below.

Embodiments disclosed herein may be implemented via the server(s) 102 and/or the clients 106, 108, 110. For example, various features may be implemented via an application on the clients 106, 108, 110. The disclosed embodiments may be implemented via software and/or hardware.

As shown, a plurality of clients 106, 108, 110 may send requests to the servers 102 via network 104. The client devices 106, 108, 110 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be practiced in a wide variety of network environments (represented by network 104) including, for example, TCP/IP-based networks, telecommunications networks, wireless networks, etc. The network 104 may take any suitable form, such as a wide area network or Internet and/or one or more local area networks (LAN's). The network 104 may include any suitable number and type of devices, e.g., routers and switches, for forwarding requests including search or web object requests from each client to the pertinent application (e.g., search or web application) and search or web results back to the requesting clients.

An application offering a service to client devices may be implemented on any number of servers although only a single server 102 is illustrated for clarity. In some embodiments, an application installed on the client devices enables the client devices to send service requests to the server 102. For example, the application installed on the client devices may be a browser or a mobile application configured to communicate with an application on the server 102.

A client device may transmit a request to the server 102 in response to user input received or detected by the client device. Alternatively, a client device may transmit a request to the server 102 automatically (e.g., where the client device periodically polls the server 102 for current information).

The client device may receive input when a user interacts with the client device. More particularly, the user action may include a user accessing or interacting with a web page, resulting in the transmission of a hypertext transfer protocol (HTTP) request by the browser to a web server. Alternatively, the user action may include the interaction with an application installed on the client device. For example, a user action may include interaction with a mobile application via a touch-screen display of a mobile device, submission of a short message service (sms) message, or voice input.

The server(s) 102 may provide a requested service to a client device by obtaining a response to the client request and transmitting the response to the client device, as will be described in further detail below. In some embodiments, the response may be generated based, at least in part, on information retained in a user profile of the user. Such information may include, but is not limited to, browsing history, search history, purchase history, geographic location (e.g., work, home, and/or current location), gender, age, interests, marital status, and/or language. An example user profile will be described in further detail below.

The server 102 (or servers) may have access to a plurality of user profiles of users. Each profile may be associated with a corresponding user represented by user account, browser, and/or client device.

A variety of mechanisms may be implemented to support the generation of user profiles including, but not limited to, collecting or mining navigation history, stored documents, tags, messages, or annotations, to provide a few examples. Profiles of users of a search engine, for example, may give a search engine provider a mechanism to retrieve annotations, tags, stored pages, navigation history, or the like, which may be useful for making relevance determinations of search results, such as with respect to a particular user. In addition, user profiles may be used to generate or obtain digital audio data that may be presented as an introduction to or summary of search results.

In accordance with various embodiments, the server(s) 102 may have access to one or more user logs 118 (e.g., user databases) into which user information is retained for each of a plurality of users. This user information or a portion thereof may be referred to as a user profile. More particularly, the user profile may include public information that is available in a public profile and/or private information. The user logs 118 may be retained in one or more memories that are coupled to the server 102.

A user profile may be associated with one or more client devices. Conversely, each client device may be associated with a set of one or more users, enabling user profile(s) associated with the client device to be identified.

The user information retained in a user profile may indicate a plurality of features for a corresponding user. More particularly, the features may include personal information such as demographic information (e.g., age, marital status, and/or gender) and/or geographic information (e.g., residence address, work address, zip code, and/or area code). The features may also indicate additional characteristics of the user such as a language of the user and/or interests of the user.

In some instances, the geographic information maintained in a user profile may indicate the current location of a user. The current location of a user may be identified based upon signals explicitly transmitted by the user or implicit signals. Examples of implicit signals include an Internet Protocol (IP) address or Global Positioning System (GPS) location of a client device, which may be used to infer a location of the user. As another example, the user's location may be implied through cell tower triangulation. In addition, a user may explicitly check in to a location via the use of a check in application, which may be accessed via a website and/or installed on a client device such as a mobile device.

In addition, each time a user performs online activities such as clicking on a web page (or region thereof) or an advertisement, or purchasing goods or services, information regarding such activity or activities may be retained as user data in the user profile. For example, the user profile may indicate the identity of web sites visited, identity of ads that have been selected (e.g., clicked on) and/or a timestamp. In addition, the features may indicate a purchase history with respect to one or more products, one or more types of products, one or more services, and/or one or more types of services.

The user logs 118 may further include query logs into which search information is retained. Each time a user performs a search on one or more search terms, information regarding such search may be retained in the query logs. For instance, the user's search request may contain any number of parameters, such as user or browser identity and the search terms, which may be retained in the query logs. Additional information related to the search, such as a timestamp, may also be retained in the query logs along with the search request parameters. When results are presented to the user based on the entered search terms, parameters from such search results may also be retained in the query logs. For example, an identity of the specific search results (e.g., Uniform Resource Locators (URLs)), such as the web sites, the order in which the search results are presented, whether each search result is a sponsored or algorithmic search result, the owner (e.g., web site) of each search result, and/or whether each search result is selected (i.e., clicked on) by the user (if any), may be retained in the query logs.

Figure 2:
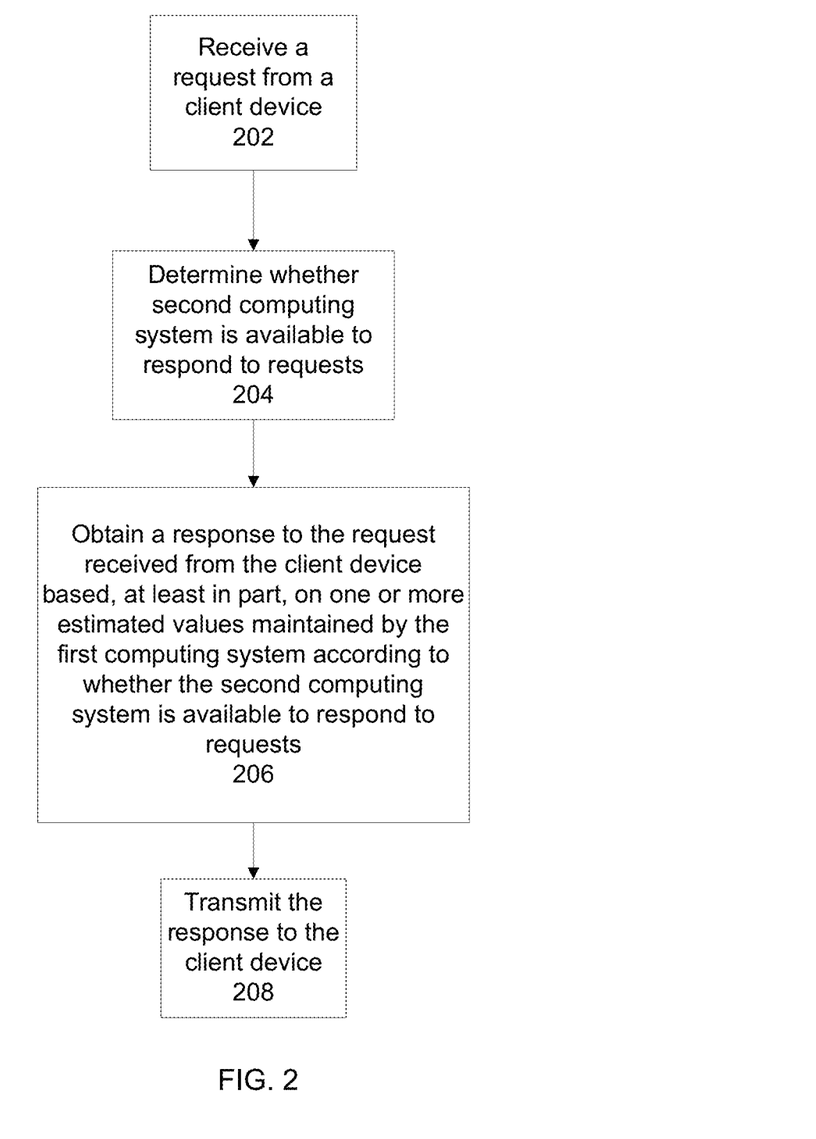
FIG. 2 is a process flow diagram illustrating an example method of improving system performance in accordance with various embodiments.

FIG. 2 is a process flow diagram illustrating an example method of improving system performance in accordance with various embodiments. A first computing system may receive a request via a network from a client device at 202. The first computing system may include one or more servers that provide at least a first service and that are configured to provide responses to requests from client devices. For example, the first service may be a video service that provides streaming video for a selected video title in response to a request for the video title from a client device.

The request may include a value of one or more parameters. More particularly, the request may include an Internet Protocol (IP) address or additional information that may indicate a location of the client device or an identity of the user. In addition, the request may identify the service being requested and/or any parameter value(s) pertinent to the service being requested. For example, where the service is a video service, the request may identify a requested video title, as well as indicate a browser of the client device, an operating system of the client device, a bandwidth, and/or additional parameter values.

The first computing system may obtain one or more parameter values from the request. For example, the first computing system may identify the requested video title, the browser of the client device, the operating system of the client device, and/or additional parameter values.

At least a second computing system may be configured to provide a second service. More particularly, the second computing system may be configured to provide data (e.g., intermediate data) in response to requests such as those received from the first computing system.

For example, the first computing system may maintain, for each video title available from the video service, a plurality of different video files that correspond to different possible combinations of parameter values. Each of the different video files associated with a given video title may have a different corresponding set of file characteristics (e.g., high definition, low definition, etc.). Moreover, each of the different video files may correspond to a different one of a plurality of categories of video files. The second computing system may be configured to select, for a particular combination of parameter values, one of the categories of video files, where each of the categories corresponds to a different subset or combination of parameter values.

Typically, the first computing system obtains the intermediate data from the second computing system to respond to a client request, and the first computing system generates or otherwise obtains a response to the client request based, at least in part, on the intermediate data. However, in accordance with various embodiments, the first computing system obtains the intermediate data (e.g., category of video files) from the second computing system for a particular client request only where the first computing system has determined that the second computing system is "available" to respond to requests from the first computing system.

The first computing system may determine at 204 whether a second computing system is available to respond to requests from the first computing system. More particularly, the second computing system may be determined to be "unavailable" if the second computing system is overloaded (e.g., slow to respond to requests from the second computing system). Various mechanisms for determining the availability of the second computing system will be described in further detail below.

The first computing system may obtain a response to the request received from the client device at 206 based, at least in part, on one or more estimated values maintained by the first computing system according to whether the second computing system is available to respond to requests from the first computing system. More particularly, if the first computing system has determined that the second computing system is unavailable to respond to requests from the first computing system, the first computing system may generate or otherwise obtain a response to the request based, at least in part, one or more estimated values.

For example, the first computing system may maintain a lookup table in one or more memories of the first computing system, where each entry in the lookup table maps an estimated value to a set of values, which may include one or more possible parameter value(s). The set of values may also include information such as that obtained or derived from a user profile. The first computing system may perform a lookup using values including at least a subset of the parameter values of the client request. The values used in the lookup may also include or be derived from information obtained from a user profile corresponding to the client device and/or user of the client device. In this manner, the first computing system may obtain the estimated value(s) mapped to a set of values including one or more parameter value(s) of the client request. Therefore, where the second computing system is unavailable, the first computing system may lookup estimated value(s) that may be used instead of the intermediate data it would have otherwise obtained from the second computing system.

Due to the limited amount of memory within the first computing system, the first computing system may not store mappings for all possible combinations of parameter values. For example, while the second computing system may determine the optimal file given a set of 15 parameter values, the lookup table maintained by the first computing system may enable an estimated value to be obtained using 2 of the 15 parameter values. Since the estimated value(s) are obtained from a limited amount of information maintained by the first computing system, the estimated value(s) will generally be less accurate than the intermediate data that would have been obtained from the second computing system. However, because the first computing system can provide a response to the client request without communicating with the second computing system, client responses may be provided to client devices in an efficient manner in instances where the second computing system is overloaded. Moreover, since the first computing system does not send system requests to the second computing system in the event that the second computing system is overloaded, the load on the second computing system may be reduced, resulting in overall improved system performance.

The first computing system may generate or obtain the response to the client based, at least in part, on the estimated value(s). For example, where the estimated value(s) identifies a particular category of file and the requested title has associated therewith a plurality of files, the first computing system may identify or retrieve a particular video file corresponding to the category of file identified by the estimated value(s).

Alternatively, where the first computing system has determined that the second computing system is available, the first computing system may transmit a system request to the second computing system to obtain intermediate data for the client request. In some instances, the second computing system may transmit one or more parameter values of the client request, intermediate information derived from the parameter value(s) of the client request to the second computing system, and/or information that is pertinent to the client or user. Upon receiving the intermediate data from the second computing system, the first computing system may generate or otherwise obtain a response to the client request using the intermediate data. For example, where the intermediate data identifies a particular file category, the first computing system may identify or retrieve a file corresponding to the particular file category.

The first computing system may transmit the response to the client device at 208. The response may include content (e.g., audio, video, images, and/or text) and/or metadata (e.g., identification of a particular file). For example, the video system may stream the identified file to the client device.

Determining System Availability

The first computing system may determine whether the second computing system is available based upon various factors. For example, the first computing system may determine whether the second computing system is available based upon a maximum time threshold within which responses from the second computing system are desired by the first computing system and an actual time within which the responses are received by the first computing system from the second computing system. Therefore, the second computing system may be considered to be available if a latency with which the second computing system responds to requests from the first computing system is less than a maximum latency threshold.

In accordance with various embodiments, the maximum latency threshold may be defined according to the maximum time threshold T within which the second computing system is to respond to requests from the first computing system and a percentage P of total system requests from the first computing system to the second computing system to which responses are to be received within the time threshold T.

Figure 3:
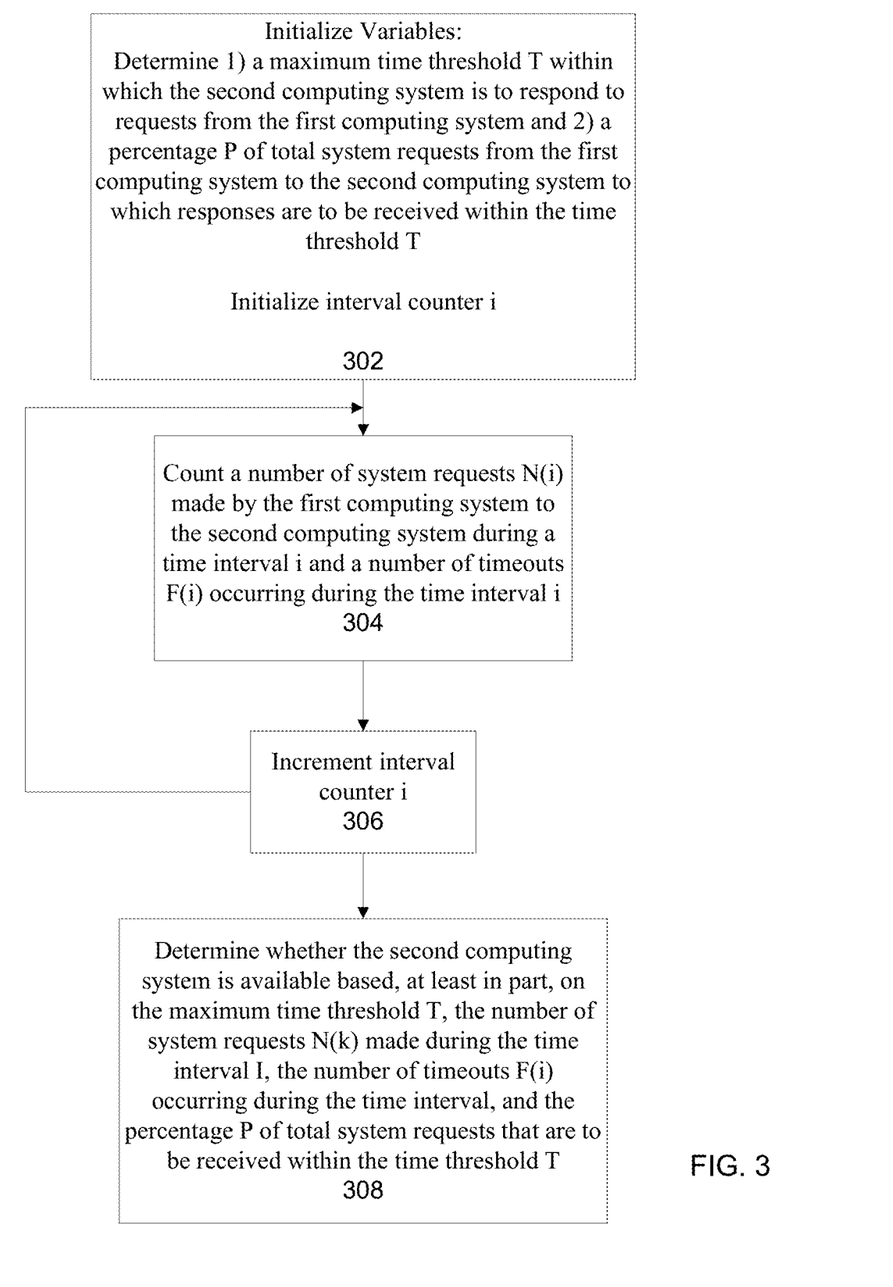
FIG. 3 is a process flow diagram illustrating an example method of determining whether a computing system is available in accordance with various embodiments.

FIG. 3 is a process flow diagram illustrating an example method of determining whether a computing system is available in accordance with various embodiments. As shown at 302, the first computing system may initialize variables. More particularly, the first computing system may determine or establish a maximum time threshold T within which the second computing system is to respond to requests from the first computing system. In addition, the first computing system may determine or establish a percentage P of total system requests from the first computing system to the second computing system to which responses are to be received within the time threshold T. Other variables that may be initialized include an interval counter i.

As shown at 304, for each time interval I, the first computing system counts a number of system requests N(i) made by the first computing system to the second computing system during the time interval and a number of timeouts F(i) occurring during the time interval (e.g., the number of times responses are not received by the first computing system from the second computing system within the desired time threshold T). Prior to a time interval i or at the beginning of the time interval, the number of system requests N(i) and the number of timeouts F(i) may be initialized to zero. During the time interval i, where the first computing system transmits a system request to the second computing system, the number of system requests N(i) is incremented. If the system request results in a timeout, the system request may be considered a "failure" (e.g., not completed) and the number of timeouts F(i) is incremented.

In accordance with various embodiments, the number of system requests N(i) and the number of timeouts/failures F(i) may be maintained in corresponding arrays. More particularly, the array N[i] may store the total number of requests made by the first computing system to the second computing system during an interval i in a corresponding element of the array N[i]. Similarly, the array F[i] may store the total number of failures of the requests made by the first computing system to the second computing system during an interval i in a corresponding element of the array F[i]. For example, the arrays N[i] and F[i] may each be an array of X (e.g., 3) elements that maintains information for X time intervals.

At 306, the first computing system may increment the interval counter i upon or after expiration of the time interval. For example, a time interval may include a particular number of milliseconds or seconds. As another example, a time interval may be incremented after a particular number of system requests have been transmitted by the first computing system to the second computing system. Where the first computing system maintains information over X time intervals in arrays of X elements, the interval counter i may be incremented such that i=(i+1) % X. The process may repeat at 304 for one or more additional intervals.

The first computing system may determine at 308 whether the second computing system is available to respond to requests from the first computing system based, at least in part, on the maximum time threshold T within which the second computing system is to respond to requests from the first computing system, the number of system requests N(i) made by the first computing system to the second computing system during the time interval, and the number of timeouts F(i) occurring during the time interval i. In addition, the second computing system may determine whether the second computing system is available further based upon the percentage P of total system requests from the first computing system to the second computing system to which responses are to be received within the time threshold T.

For example, the first computing system may determine whether the second computing system is available by evaluating the following condition:

$$\text{Boolean}=(F(i)+F(i-1))/(N(i)+N(i-1))<(100-P)$$

If $(F(i)+F(i-1))/(N(i)+N(i-1))$ is less than $(100-P)$ (e.g., the value of the condition is true), the second computing system is available and the first computing system may call the second computing system to obtain the intermediate data. Alternatively, if $(F(i)+F(i-1))/(N(i)+N(i-1))$ is not less than $(100-P)$ (e.g., the value of the condition is false), the second computing system is unavailable and the second computing system may use locally maintained estimated values. In this manner, a condition may be evaluated to determine whether the latency within which the second computing system responds to requests from the first computing system is less than a maximum latency threshold.

In one embodiment, where the arrays N[i] and F[i] each hold X (e.g., 3) elements, the condition may be represented as follows:

$$\text{Boolean}=(F(i)+F[(i-1)\% X])/(N(i)+N[(i-1)\% X])<(100-P)$$

The process may continue to collect additional information at 304 so that it may re-evaluate whether the second computing system is available. The first computing system may evaluate the availability of the second computing system periodically (e.g., after the expiration of a period of time or one or more time intervals). Alternatively, the first computing system may evaluate the availability of the second computing system when a client request is received. A result of the determination evaluation may be stored by the second computing system for later retrieval.

While the above-described embodiments refer to a second computing system, it is important to note that these examples are merely illustrative. Therefore, the disclosed embodiments may also be applied to multiple computing systems from which intermediate data may be obtained for use in generating client responses.

Network Environment

Figure 4:
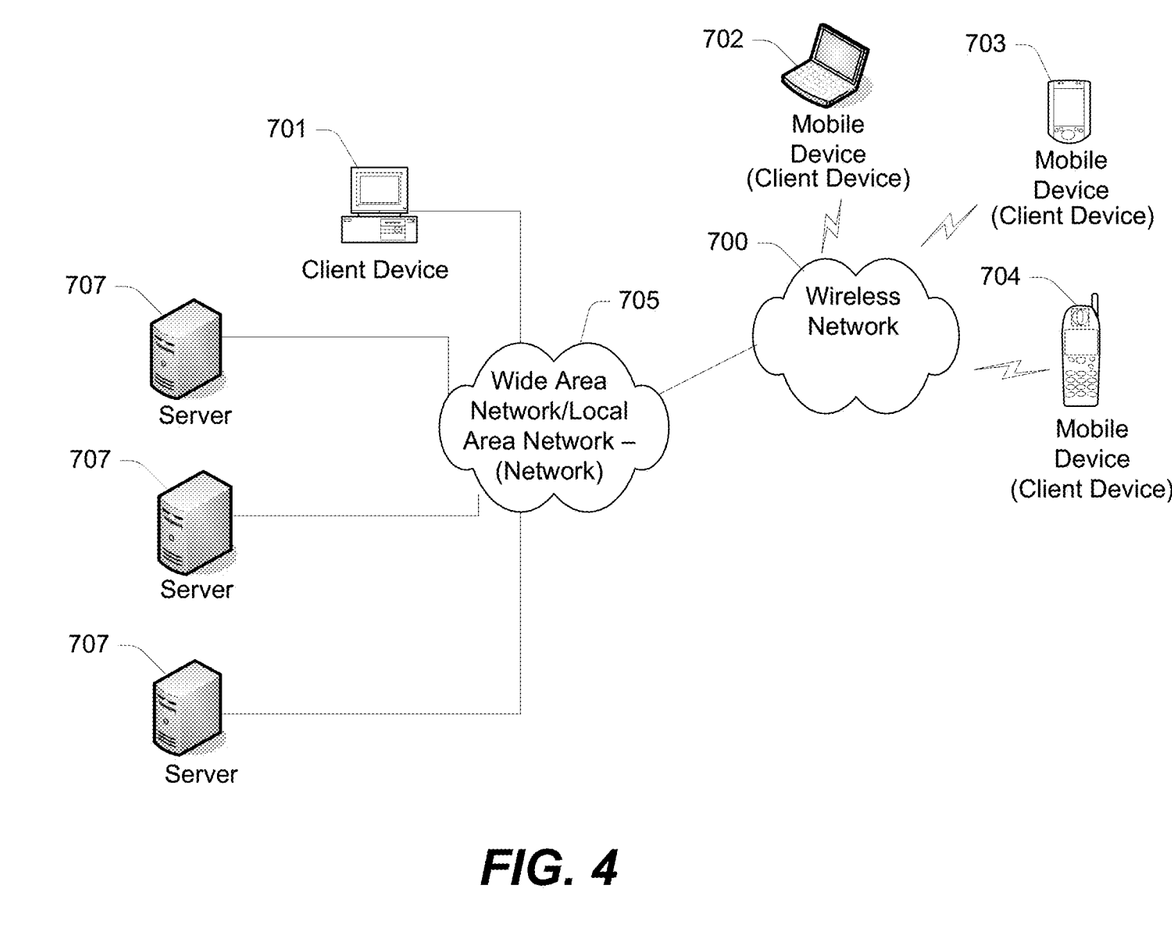
FIG. 4 is a schematic diagram illustrating an example embodiment of a network in which various embodiments may be implemented.

The disclosed embodiments may be implemented in any of a wide variety of computing contexts. FIG. 4 is a schematic diagram illustrating an example embodiment of a network. Other embodiments that may vary, for example, in terms of arrangement or in terms of type of components, are also intended to be included within claimed subject matter.

Implementations are contemplated in which users interact with a diverse network environment via any type of computer (e.g., desktop, laptop, tablet, etc.), media computing platforms (e.g., cable and satellite set top boxes and digital video recorders), handheld computing devices (e.g., PDAs), cell phones, or any other type of computing or communication platform.

As shown, FIG. 4, for example, includes a variety of networks, such as a LAN/WAN 705 and wireless network 700, a variety of devices, such as client devices 701-704, and a variety of servers 707 such as content server(s), a web server, and/or a search server. As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 4 by server(s) 707, which may correspond to multiple distributed devices and data store(s). The server(s) 707 and/or corresponding data store(s) may store user account data, user information, and/or content. The server(s) 707 may be further configured to operate according to various embodiments described herein.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content items may be identified and retrieved via a content distribution network. A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Services may also be provided in a peer-to-peer network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling devices via an ad hoc arrangement or configuration. A peer-to-peer network may employ some devices capable of operating as both a "client" and a "server."

The network environment may include a wireless network that couples client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Communications transmitted via a network typically include signal packets. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

Signal packets may be communicated between devices of a network, such as, for example, to one or more sites employing a local network address. A signal packet may, for example, be communicated over the Internet from a user site via an access device coupled to the Internet. Likewise, a signal packet may be forwarded via network devices to a target site coupled to the network via a network access device, for example. A signal packet communicated via the Internet may, for example, be routed via a path of gateways, servers, etc. that may route the signal packet in accordance with a target address and availability of a network path to the target address.

Various embodiments may be employed via one or more servers. A computing device that is capable of sending or receiving signals, such as via a wired or wireless network, or capable of processing or storing signals, such as in memory as physical memory states, may operate as a server. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content items may be identified or provided via a content server. A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOW) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 5:
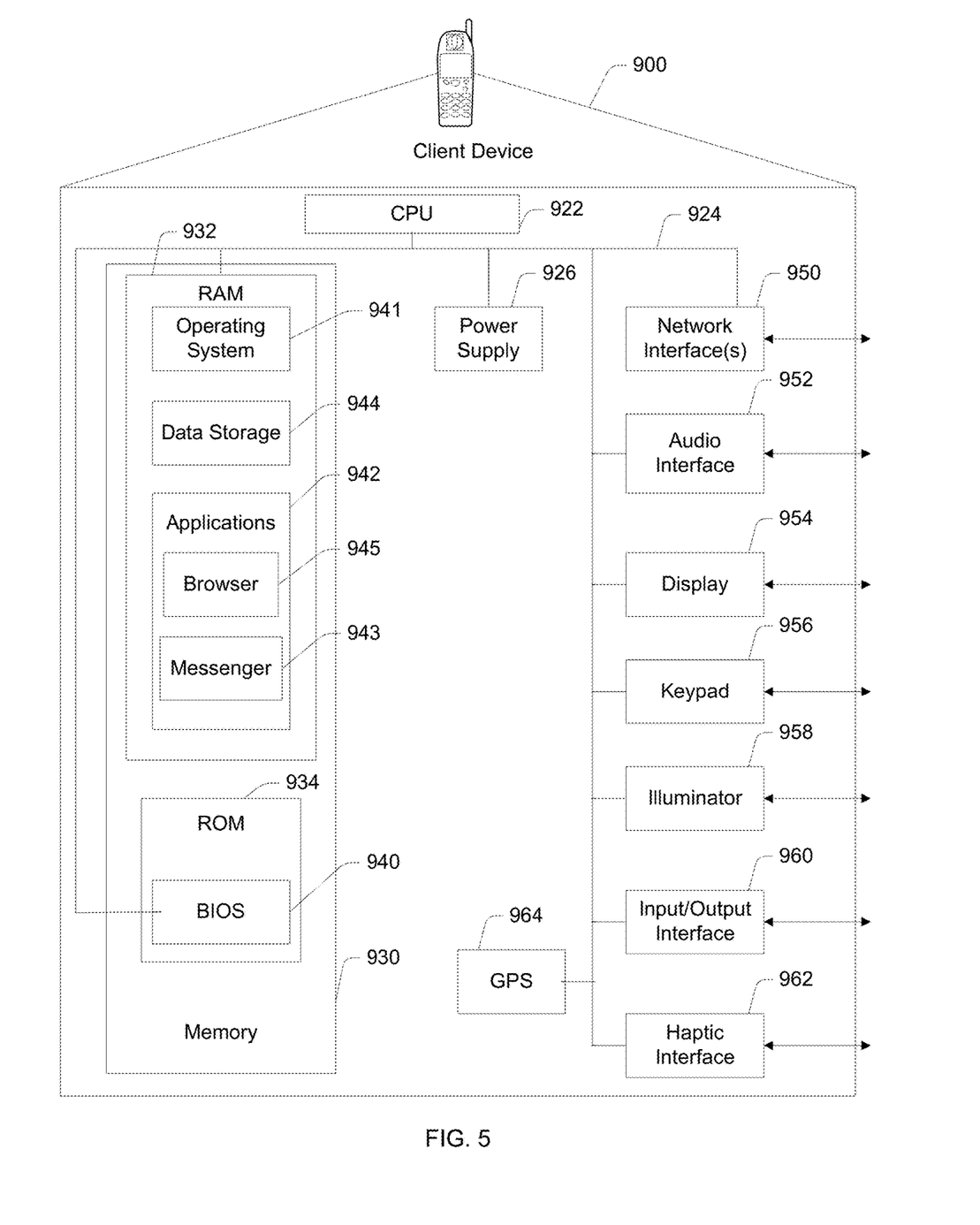
FIG. 5 is a diagram illustrating an example client device in which various embodiments may be implemented.

FIG. 5 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 900 may include one or more central processing units (CPUs) 922, which may be coupled via connection 924 to a power supply 926 and a memory 930. The memory 930 may include random access memory (RAM) 932 and read only memory (ROM) 934. The ROM 934 may include a basic input/output system (BIOS) 940.

The RAM 932 may include an operating system 941. More particularly, a client device may include or may execute a variety of operating systems, including a personal computer operating system, such as a Windows, iOS or Linux, or a mobile operating system, such as iOS, Android, or Windows Mobile, or the like. The client device 900 may also include or may execute a variety of possible applications 942 (shown in RAM 932), such as a client software application such as messenger 943, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 944. A client device may also include or execute an application such as a browser 945 to perform a variety of possible tasks, such as browsing, searching, playing various forms of content, including locally stored or streamed video, or games (such as fantasy sports leagues).

The client device 900 may send or receive signals via one or more interface(s). As shown in this example, the client device 900 may include one or more network interfaces 950. The client device 900 may include an audio interface 952. In addition, the client device 900 may include a display 954 and an illuminator 958. The client device 900 may further include an Input/Output interface 960, as well as a Haptic Interface 962 supporting tactile feedback technology.

The client device 900 may vary in terms of capabilities or features. Claimed subject matter is intended to cover a wide range of potential variations. For example, a cell phone may include a keypad such 956 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 964 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print. From the identity of the user, a user profile and/or client profile may be identified or obtained.

Regardless of the system's configuration, it may employ one or more memories or memory modules configured to store data, program instructions for the general-purpose processing operations and/or the inventive techniques described herein. For example, the program instructions may control the operation of one or more applications. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
   receiving, by a first computing system including one or more servers, a request for information via a network from a client device;
   determining, by the first computing system, whether a second computing system including one or more second servers is available to respond to requests from the first computing system;
   obtaining, by the first computing system, the information requested by the client device, wherein the obtaining comprises:
      in response to determining that the second computing system is not available to respond to requests from the first computing system, obtaining, by the first computing system, the information requested by the client device by:
         obtaining, by the first computing system, one or more parameter values of the request, wherein one or more first parameter values correspond to a first category of file and one or more second parameter values correspond to a second category of file;
         obtaining, by the first computing system from a user profile in one or more memories of the first computing system, one or more estimated data values using the one or more parameter values, wherein the one or more estimated data values identify the first category of file, wherein the user profile is indicative of a plurality of features of a user associated with the client device; and
         generating, by the first computing system, the information requested by the client device based, at least in part, on the one or more estimated data values without communicating with the second computing system;
   and
   transmitting, by the first computing system, a response including the information to the client device.

2. The method of claim 1, wherein the user profile comprises at least one of a browsing history, a search history, a purchase history or a geographic location.

3. The method of claim 1, wherein determining whether the second computing system is available to respond to requests from the first computing system comprises:
   ascertaining whether the second computing system is available based, at least in part, on a maximum time threshold and response times within which responses to requests from the first computing system to the second computing system are received by the first computing system.

4. The method of claim 1, wherein determining whether the second computing system is available to respond to requests from the first computing system comprises determining whether a latency with which the second computing system responds to requests from the first computing system is less than a maximum latency threshold.

5. The method of claim 1, wherein the first category of file comprises a first category of video file.

6. The method of claim 1, comprising:
   determining whether the second computing system is available based, at least in part, on at least one of: a maximum time threshold T within which the second computing system is to respond to requests from the first computing system, a percentage P of total system requests from the first computing system to the second computing system to which responses are to be received within the maximum time threshold T, a number of system requests made by the first computing system to the second computing system during a time interval I, or a number of timeouts occurring during the time interval I.

7. The method of claim 1, comprising:
   for a time interval I, count a number of system requests made by the first computing system to the second computing system during the time interval I and a number of timeouts occurring during the time interval I;
   wherein determining whether the second computing system is available to respond to requests from the first computing system is performed based, at least in part, on the number of system requests made by the first computing system to the second computing system during the time interval I and a number of timeouts occurring during the time interval I.

8. The method of claim 5, wherein the second category of file comprises a second category of video file.

9. A computing system, comprising:
   one or more servers, the one or more servers including one or more processors and one or more memories, the one or more servers being configured to:
      receive a request for information via a network from a client device;
      determine whether a second computing system including one or more second servers is available to respond to requests from the computing system;
      obtain the information requested by the client device, wherein the obtaining comprises:
         in response to determining that the second computing system is not available to respond to requests from the computing system, obtaining the information requested by the client device by:
            obtaining one or more parameter values of the request, wherein one or more first parameter values correspond to a first category of file and one or more second parameter values correspond to a second category of file;

obtaining, from a user profile in the one or more memories, one or more estimated data values using the one or more parameter values, wherein the one or more estimated data values identify the first category of file, wherein the user profile is indicative of a plurality of features of a user associated with the client device; and generating the information requested by the client device based, at least in part, on the one or more estimated data values without communicating with the second computing system;

and transmit a response including the information to the client device.

10. The computing system of claim 9, the one or more processors and the one or more memories being configured to:

receive a second request for second information; and in response to determining that the second computing system is available to respond to requests from the computing system, obtain the second information based, at least in part, on data received from the second computing system.

11. The computing system of claim 9, wherein determining whether the second computing system is available to respond to requests from the computing system comprises ascertaining whether the second computing system is available based, at least in part, on a maximum time threshold and response times within which responses to requests from the computing system to the second computing system are received by the computing system.

12. The computing system of claim 9, wherein determining whether the second computing system is available to respond to requests from the computing system comprises determining whether a latency with which the second computing system responds to requests from the computing system is less than a maximum latency threshold;

wherein the maximum latency threshold is defined according to a maximum time threshold T within which the second computing system is to respond to requests from the computing system and a percentage P of total system requests from the computing system to the second computing system to which responses are to be received within the maximum time threshold T.

13. The computing system of claim 9, the one or more processors and the one or more memories being configured to:

determine whether the second computing system is available based, at least in part, on at least one of: a maximum time threshold T within which the second computing system is to respond to requests from the computing system, a percentage P of total system requests from the computing system to the second computing system to which responses are to be received within the maximum time threshold T, a number of system requests made by the computing system to the second computing system during a time interval I, or a number of timeouts occurring during the time interval I.

14. The computing system of claim 9, the one or more processors and the one or more memories being configured to:

for a time interval I, count a number of system requests made by the computing system to the second computing system during the time interval I and a number of timeouts occurring during the time interval I;

wherein determining whether the second computing system is available to respond to requests from the computing system is performed based, at least in part, on the number of system requests made by the computing system to the second computing system during the time interval I and a number of timeouts occurring during the time interval I.

15. A system comprising:

a first computing system including one or more servers, wherein the first computing system is configured to:

receive a request for information via a network from a client device;

determine whether a second computing system, including one or more second servers, is available to respond to requests from the first computing system;

obtain the information requested by the client device, wherein the obtaining comprises:

in response to determining that the second computing system is not available to respond to requests from the first computing system, obtaining the information requested by the client device by:

obtaining one or more parameter values of the request, wherein one or more first parameter values correspond to a first category of file and one or more second parameter values correspond to a second category of file;

obtaining, from a user profile in one or more memories of the first computing system, one or more estimated data values using the one or more parameter values, wherein the one or more estimated data values identify the first category of file, wherein the user profile is indicative of a plurality of features of a user associated with the client device; and generating the information requested by the client device based, at least in part, on the one or more estimated data values without communicating with the second computing system;

and transmit a response including the information to the client device.

16. The system of claim 15, the first computing system being configured to:

receive a second request for second information; and in response to determining that the second computing system is available to respond to requests from the first computing system, obtain the second information based, at least in part, on data received from the second computing system.

17. The system of claim 15, wherein determining whether the second computing system is available to respond to requests from the first computing system comprises ascertaining whether the second computing system is available based, at least in part, on a maximum time threshold and response times within which responses to requests from the first computing system to the second computing system are received by the first computing system.

18. The system of claim 15, wherein determining whether the second computing system is available to respond to requests from the first computing system comprises determining whether a latency with which the second computing system responds to requests from the first computing system is less than a maximum latency threshold;

wherein the maximum latency threshold is defined according to a maximum time threshold T within which the second computing system is to respond to requests from the first computing system and a percentage P of total system requests from the first computing system to the second computing system to which responses are to be received within the maximum time threshold T.

19. The system of claim 15, the first computing system being configured to:
determine whether the second computing system is available based, at least in part, on at least one of: a maximum time threshold T within which the second computing system is to respond to requests from the first computing system, a percentage P of total system requests from the first computing system to the second computing system to which responses are to be received within the maximum time threshold T, a number of system requests made by the first computing system to the second computing system during a time interval I, or a number of timeouts occurring during the time interval I.

20. The system of claim 15, the first computing system being configured to:
for a time interval I, count a number of system requests made by the first computing system to the second computing system during the time interval I and a number of timeouts occurring during the time interval I;
wherein determining whether the second computing system is available to respond to requests from the first computing system is performed based, at least in part, on the number of system requests made by the first computing system to the second computing system during the time interval I and a number of timeouts occurring during the time interval I.

21. The method of claim 1,
wherein the user profile comprises at least one of demographic information, geographic information, one or more languages or one or more interests.

22. The method of claim 21, comprising determining a location of the geographic information based, at least in part, on at least one of an Internet Protocol (IP) address, a Global Positioning System (GPS) location, cell tower triangulation or an explicit selection by the user.

23. The method of claim 1, the second computing system being a subsystem of the first computing system.

* * * * *